(12) United States Patent
Tsuchiya (10) Patent No.: US 8,004,598 B2
(45) Date of Patent: Aug. 23, 2011

(54) FOCUS ADJUSTMENT APPARATUS AND IMAGE CAPTURING APPARATUS

(75) Inventor: Hitoshi Tsuchiya, Hamura (JP)

(73) Assignee: Olympus Corporation, Tokyo (JP)

( * ) Notice: Subject to any disclaimer, the term of this patent is extended or adjusted under 35 U.S.C. 154(b) by 415 days.

(21) Appl. No.: 12/388,714

(22) Filed: Feb. 19, 2009

(65) Prior Publication Data
US 2009/0237550 A1    Sep. 24, 2009

(30) Foreign Application Priority Data

Mar. 24, 2008   (JP) ................................ 2008-076642

(51) Int. Cl.
*G03B 13/36*   (2006.01)
(52) U.S. Cl. ....................................... 348/346; 348/356
(58) Field of Classification Search .................. 348/346, 348/349, 353, 354, 356
See application file for complete search history.

(56) References Cited

U.S. PATENT DOCUMENTS

| | | | |
|---|---|---|---|
| 5,485,209 A * | 1/1996 | Muramoto et al. | 348/349 |
| 2009/0051807 A1* | 2/2009 | Kunishige et al. | 348/353 |
| 2009/0091633 A1* | 4/2009 | Tamaru | 348/208.14 |

FOREIGN PATENT DOCUMENTS
JP   2005-208274 A   8/2005

* cited by examiner

*Primary Examiner* — W. B. Perkey
(74) *Attorney, Agent, or Firm* — Westerman, Hattori, Daniels & Adrian, LLP (57) ABSTRACT

A focus adjustment apparatus or an image capturing apparatus is provided with a system controller. The system controller calculates a correlation value between an image in a focus detection area when a focusing lens is located at a lens position apart by a predetermined distance from a lens position where a focus evaluation value reaches a peak value, to a close end side, and an image in a focus detection area when a focusing lens is located at a lens position apart by a predetermined distance from a lens position where a focus evaluation value reaches a peak value, to an infinity side, and determines a lens position corresponding to a peak value to be a focused lens position, when a correlation value calculated by the correlation value calculation unit is over a predetermined value.

6 Claims, 9 Drawing Sheets

FOCUS ADJUSTMENT APPARATUS AND IMAGE CAPTURING APPARATUS

CROSS-REFERENCE TO RELATED APPLICATIONS

This application is based upon and claims the benefit of priority from prior Japanese Patent Application No. 2008-076642, filed Mar. 24, 2008, the entire contents of which are incorporated herein by reference.

BACKGROUND OF THE INVENTION

1. Field of the Invention

The present invention relates to a focus adjustment apparatus and an image capturing apparatus, which automatically adjust a focus based on a video signal from an image sensor.

2. Description of the Related Art

Recently, a digital single-lens reflex camera with a function of displaying an image of a subject in an electronic view finder or on a display panel, so-called a Live View (hereinafter, called a Live View), has become popular.

In a camera with such a Live View, an image of a subject can be displayed on a display panel, and a user can confirm an image of a subject and framing without viewing through a finder.

Therefore, in a camera with such a Live View, an image of a subject and framing can easily be confirmed even in photo shooting by setting a camera at unusual positions, for example, by placing a camera at a high position or a position close to the ground.

Further, in a camera with such a Live View, an image of a subject can be displayed as an electronic image, and various information such as "black defects" and "white blur" can be superimposed on the Live View.

As a focus adjustment method, a single-lens reflex camera generally employs a manual focus mode (MF), in which a focus is manually adjusted, or an autofocus mode (AF), in which a focus is automatically adjusted by detecting displacements of focus by a AF sensor provided in a camera.

In a single-lens reflex camera with a Live View, a AF sensor cannot be used while a Live View is being executed. Therefore, various methods are used for adjusting a focus while a Live View is being executed.

For example, in one method, a Live View is once stopped, and a picture is taken after a focus is automatically adjusted by using a AF sensor. In another method, a field of view is partially magnified to facilitate visual confirmation of a focused state, and a focus is manually adjusted.

A single-lens reflex camera has adopted "a Live View Autofocus", which is a focus adjustment method widely used in a compact digital camera. Generally, a single-lens reflex camera has a longer focal distance than in a compact digital camera. Thus, a depth of field is shallow, and a shooting field is largely different at infinity and close end.

Therefore, a subject with high contrast crosses a contrast detection area, and a false peak may be detected. As a result, a subject may be determined to be in-focus at an unintended focal position.

As a technique to prevent detection of a false peak (a false focus), Jpn. Pat. Appln. KOKAI Publication No. 2005-208274 discloses the following technique.

In the technique disclosed in the Publication No. 2005-208274, by moving a focusing lens from a close end to infinity, an integrated value (a focus evaluation value) by a video signal, which is obtained by eliminating a low-frequency component from an imaging signal, is calculated for a plurality of lens position, and a focus evaluation history is obtained in a first focus area, and in a second focus area for determining truth or false. A second focus area includes the whole first focus area, and is larger than the first focus area.

Thereby, a camera determines whether maximum positions of focus evaluation history in the first and second focus areas coincide, and calculates a focused lens position when the maximum values coincide, and does not calculate when the maximum values do not coincide, thereby preventing false focusing.

BRIEF SUMMARY OF THE INVENTION

According to a first aspect of the invention, there is provided a focus adjustment apparatus comprising an evaluation value calculation unit which calculates a focus evaluation value in a focus detection area in a shooting field of view, when a driven focusing lens reaches a predetermined lens position; a peak value detection unit which detects a peak value of the focus evaluation value, based on the focus evaluation value calculated by the evaluation value calculation unit, according to driving of the focusing lens; a correlation value calculation unit which calculates a correlation value between an image in the focus detection area when the focusing lens is located at a lens position apart by a predetermined distance from a lens position where the focus evaluation value reaches the peak value, to a close end side, and an image in the focus detection area when the focusing lens is located at a lens position apart by a predetermined distance from a lens position where the focus evaluation value reaches the peak value, to an infinity side; and a focused lens position determination unit which determines a lens position where the focus evaluation value reaches the peak value, to be a focused lens position of the focusing lens, when the correlation value calculated by the correlation value calculation unit is over a predetermined value.

According to a second aspect of the invention, three is provided an imaging unit comprising an evaluation value calculation unit which calculates a focus evaluation value in a focus detection area in a shooting field of view when a driven focusing lens is located at each lens position; a peak value detection unit which detects a peak value of the focus evaluation value, based on the focus evaluation value calculated by the evaluation value calculation unit; a correlation value calculation unit which calculates a correlation value between an image in the focus detection area when the focusing lens is located at a lens position apart by a predetermined distance from a lens position where the focus evaluation value reaches the peak value, to a close end side, and an image in the focus detection area when the focusing lens is located at a lens position apart by a predetermined distance from a lens position where the focus evaluation value reaches the peak value, to an infinite side; and a focused lens position determination unit which determines a lens position where the focus evaluation value reaches the peak value, to be a focused lens position of the focusing lens, when the correlation value calculated by the correlation value calculation unit is over a predetermined value.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an explanation will be given of a focus adjustment apparatus and an image capturing apparatus according to an embodiment of the invention. In this embodiment, a digital single-lens reflex camera is assumed as a focus adjustment apparatus and an image capturing apparatus.

Figure 1A:
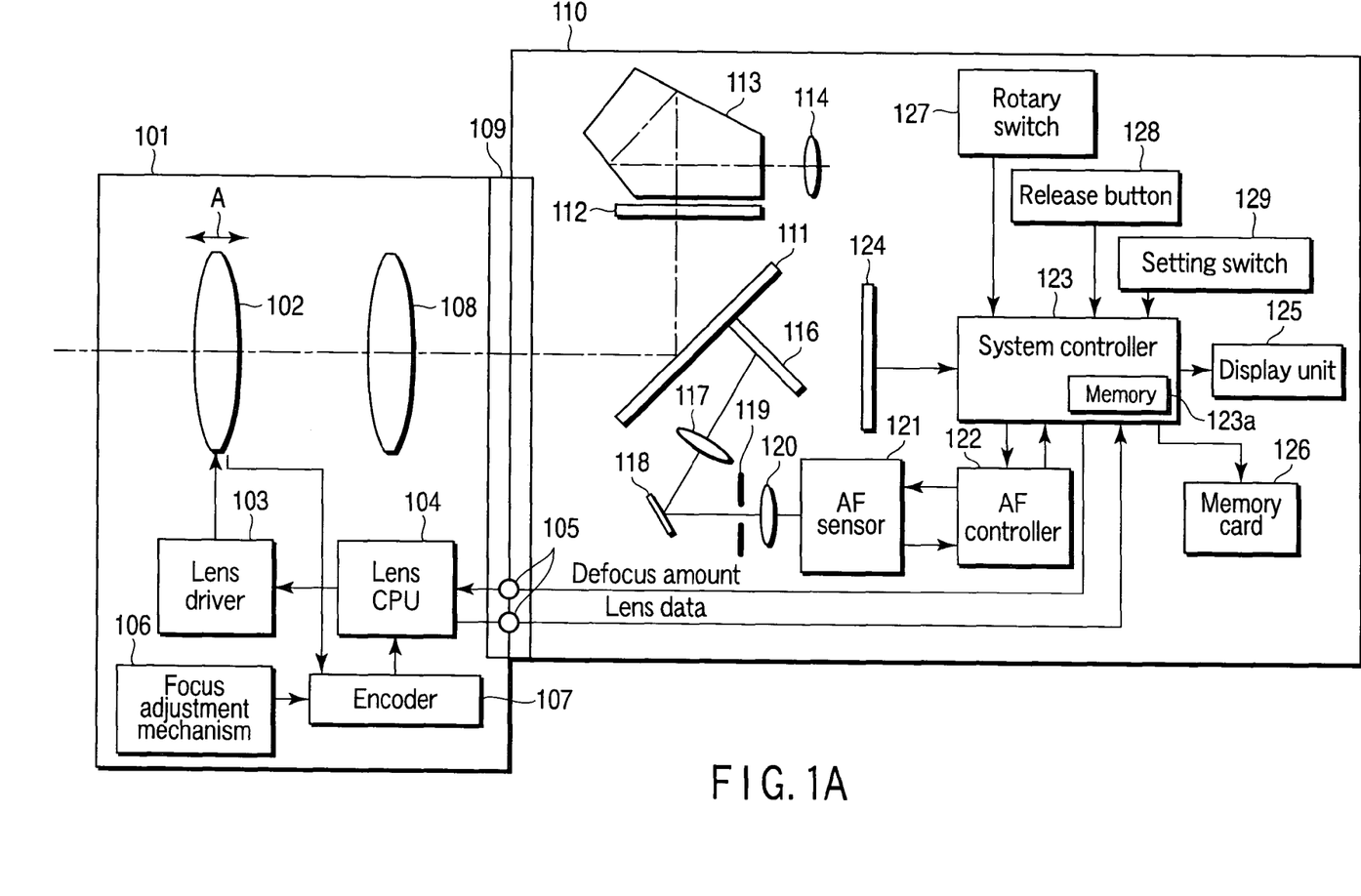
FIG. 1A is a block diagram of a digital single-lens reflex camera according to an embodiment of the invention.
Figure 1B:
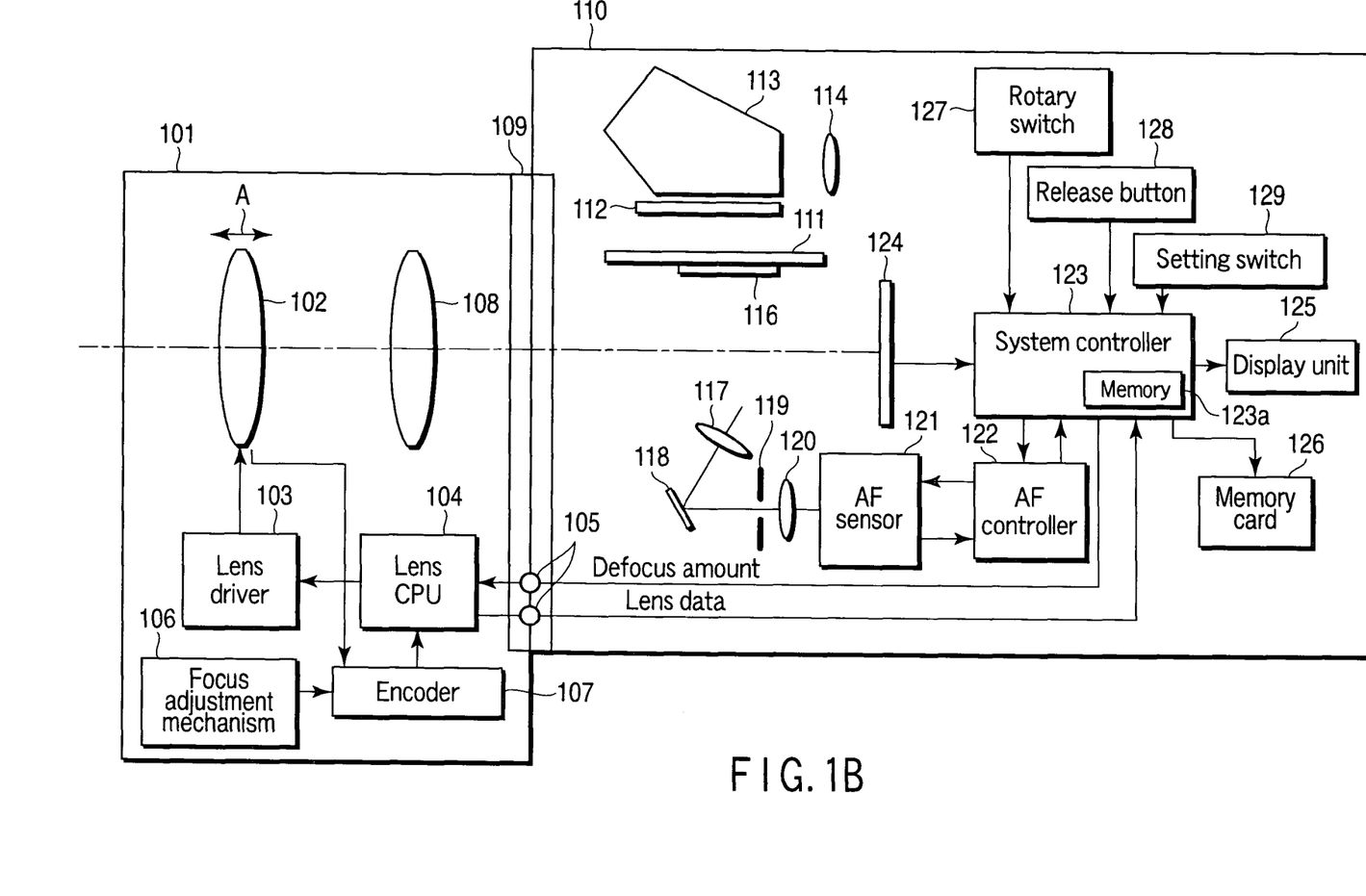
FIG. 1B is a block diagram of a digital single-lens reflex camera according to an embodiment of the invention.

FIGS. 1A and 1B show a configuration of a digital single-lens reflex camera (hereinafter, called a camera) according to this embodiment. In details, FIG. 1A shows a configuration of a camera in a normal focus adjustment state (AF by a phase difference detection method). FIG. 1B shows a configuration of a camera in a photo shooting state and Live View.

As shown in FIGS. 1A and 1B, a camera according to this embodiment comprises an interchangeable lens 101, and a camera body 110.

The interchangeable lens 101 is removably fixed to the camera body 110 through a camera mount 109. The interchangeable lens 101 has a focusing lens 102, a lens driver 103, a lens CPU 104, a focus adjustment mechanism 106, an encoder 107, and an imaging lens 108.

The focusing lens 102 and imaging lens 108 constitute an imaging optics. The focusing lens 102 is driven in its optical axis direction (in the direction of arrow A shown in FIGS. 1A and 1B) by the lens driver 103, and adjusts a focal position in the imaging optics. Thereby, a luminous flux from a not-shown subject passing through the imaging optics is formed as a focused image on an image sensor 124 within the camera body 110.

The lens driver 103 drives the focusing lens 102 by a DC motor by a pulse signal from the lens CPU 104.

The lens CPU 104 is a control circuit to control the lens driver 103. The lens CPU 104 is communicable with a system controller 123 in the camera body 110 through a communication connector 105. The lens CPU 104 supplies the system controller 123 with various lens data, such as variations of a focusing lens in a production process and aberration of a focusing lens, which are previously stored in the lens CPU 104, for example.

The focusing adjustment mechanism 106 is an operation mechanism for a user to directly control driving of the focusing lens 102 in the manual focus mode. The focus adjustment mechanism 106 can give a direction and amount of driving to an infinity side (the distance between a main point of the imaging optics including the focusing lens 102 and an image-forming surface is minimum, the right side in FIGS. 1A and 1B), or to a close end side (the distance between a main point of the imaging optics including the focusing lens 102 and an image-forming surface is maximum, the left side in FIGS. 1A and 1B).

The encoder 107 detects driving directions and amounts of the focus adjustment mechanism 106 and focusing lens 102 as pulse signals, and sends them to the lens CPU 104. By counting the pulse signals from the encoder 107, the lens CPU 104 detects the operating state of the focus adjustment mechanism 106 and the position of the focusing lens 102 as driving directions and amounts, and controls the lens driver 103 so that the focusing lens 102 is accordingly driven to a desired position.

The camera body 110 comprises a main mirror 111, a focusing screen 112, a pentagonal prism 113, an eyepiece 114, a sub-mirror 116, a condenser lens 117, a total reflection mirror 118, a separator iris 119, a separator lens 120, an AF sensor 121, an AF controller 122, a system controller 123, an image sensor 124, a display unit 125, a memory card 126, a rotary switch 127, a release button 128, and a setting switch 129.

The focusing screen 112, pentagonal prism 113 and eyepiece 114 constitute finder optics. Similarly, the condenser lens 117, total reflection mirror 118, separator iris 119 and separator lens 120 form AF optics.

The main mirror 111 is rotationally movable, and adopts a half mirror in its central part. At a down position (FIG. 1-A), the main mirror 111 reflects a part of a luminous flux, entering the camera body 110 from a not-shown subject through the interchangeable lens 101, and passes a part of the luminous flux.

On the focusing screen 112, a luminous flux reflected by the main mirror 111 is formed as an image.

The pentagonal prism 113 turns the subject image formed on the focusing screen 112 upside down, and applies it to the eyepiece 114.

The eyepiece 114 magnifies a subject image from the pentagonal prism 113 to be observable by the user. Thereby, the user can observe the state of a not-shown subject.

The sub-mirror 116 is provided on the back of the half mirror of the main mirror 111, and reflects the luminous flux passing through the half mirror of the main mirror 111 toward the AF optics.

The condenser lens 117 of the AF optics condenses the luminous flux, which is reflected by the sub mirror 116 and imaged on a not-shown primary image-forming surface, and applies it to the total reflection mirror 118.

The total reflection mirror 118 reflects the luminous flux from the condenser lens 117 toward the AF sensor 121.

The separator iris 119 is provided on the front side of the AF sensor 121, and pupil divides the luminous flux from the total reflection mirror 118.

The separator lens 120 condenses the pupil divided luminous flux from the separator iris 119, and forms its image again in the AF sensor 121.

The AF sensor 121 converts the pupil divided and re-formed subject image with parallax into a video signal. The AF sensor 121 is configured to be able to detect a state of focus in two or more focus detection area in a shooting field of view.

The AF controller 122 reads a video signal pair from the AF sensor 121, and calculates a 2-image interval value of a subject image from the read video signal by a correlative arithmetic operation, for example. Amount of defocus is calculated from the 2-image interval value obtained by the AF controller 122. Further, in focus adjustment, amount of defocus to be used for the focus adjustment is selected from the amounts of defocus calculated in correspondence with two or more distance-measuring points, and the selected amount of defocus is sent to the lens CPU 104. The lens CPU 104 adjusts the focus of the focusing lens 102 based on this amount of defocus. A drive control unit is configured as described above.

The system controller 123 collectively controls all operations of the camera of FIG. 1. The system controller 123 has a memory 123a as storage to store the amount of defocus calculated from the 2-image interval value obtained by the AF controller 122.

The image sensor 124 converts the subject image formed through the imaging optics into a video signal, when the main mirror 111 is retreated from the optical axis (refer to FIG. 1B). When the subject image is converted to a video signal in the image sensor 124, the system controller 123 performs various image processing for the video signal obtained by the image sensor 124, and then displays the resultant image on the display unit 125, or stores it in the memory card 126.

The setting switch 129 is a switch, which is changed in states when a setting button provided on the outer casing of the camera body 110 is depressed, and gives various setting instructions from the user to the system controller 123.

The rotary switch 127 is a switch, which is provided on the outer casing of the camera body 110, changes an object function depending on an imaging mode, and gives a movable amount to the system controller 123.

The release button 128 is a switch, which is changed in states when the setting button provided on the outer casing of the camera body 110 is depressed, and gives the system controller 123 an AF start instruction and a photo shooting start instruction. The release button 128 has a first release state and a second release state. When the release button 128 is pressed halfway, the first release state is set, and the AF start instruction is given to the system controller 123. When the release button 128 is pressed all the way, the second release state is set, and the photo shooting start instruction is given to the system controller 123.

Figure 2:
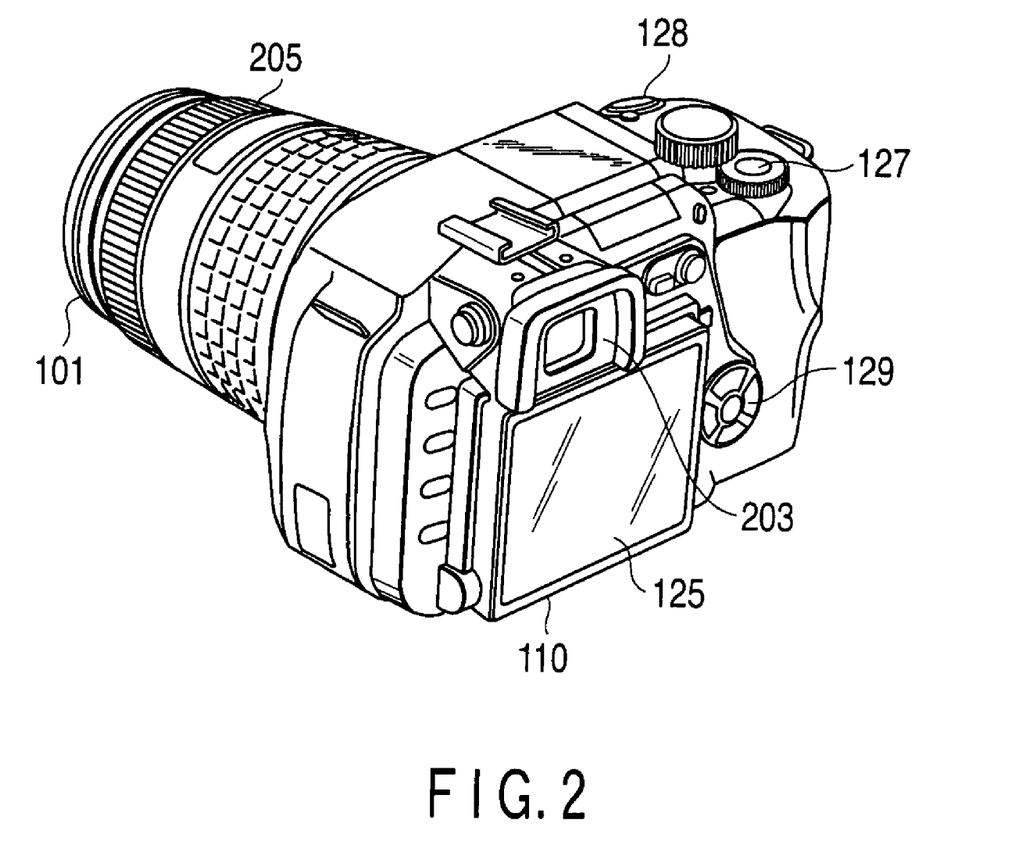
FIG. 2 is an external perspective view of a camera according to an embodiment of the invention.

FIG. 2 is an external perspective view of a camera according to this embodiment. In FIG. 2, a focus ring 205, as a part of the focus adjustment mechanism 106 provided in the interchangeable lens 101, is rotated by the user. The direction and amount of rotating the focus ring 205 are detected by the encoder 107.

A finder 203 contains the eyepiece 114 shown in FIGS. 1A and 1B. The user can observe a subject by viewing through the finder 203.

The release button 128, setting switch 129 and rotary switch 127 are operation members for operating the corresponding switches explained by referring to the FIGS. 1A and 1B.

FIGS. 3A to 3E show examples of a finder image (a field of view for photo shooting) in the finder 203. In the drawings, a subject is a chart 301 consisting of three lines. In the drawings, an image capturing apparatus according to this embodiment has nine focus adjustment areas FA1, FA2, FA3, . . . , FA7, FA8 and FA9 in a shooting field of view.

Figure 3A:
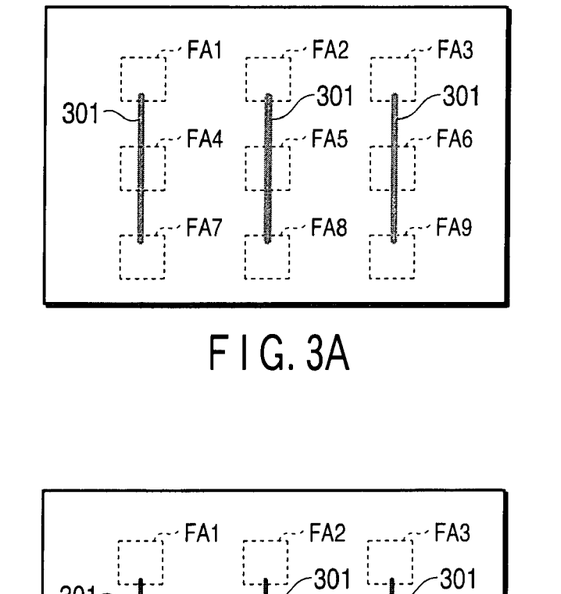
FIG. 3A shows an example of a finder image (a shooting field of view)
Figures 3B, 3C:
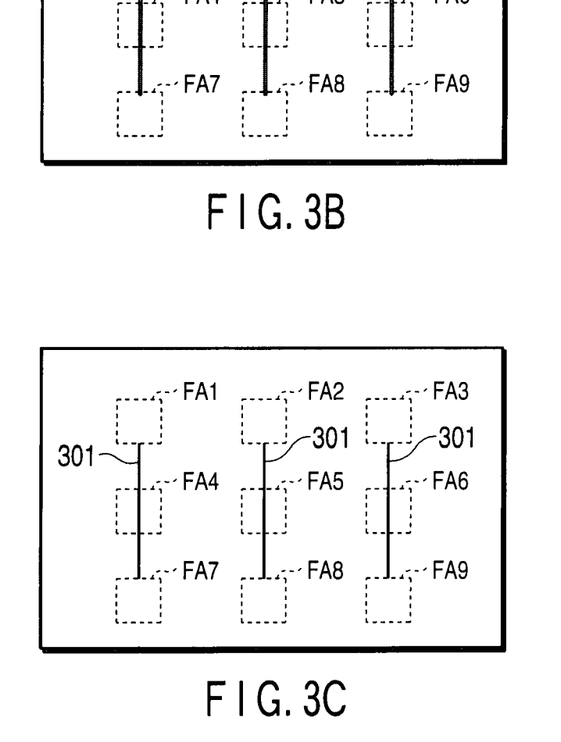
FIG. 3B shows an example of a finder image (a shooting field of view)
FIG. 3C shows an example of a finder image (a shooting field of view)

A finder image shown in FIG. 3C is a finder image when focus is achieved.

Finder images shown in FIGS. 3A and 3B are finder images, which is obtained when a plane focused on an image-forming surface exists in the focusing lens 102 (so-called "front-focus").

Figure 3D:
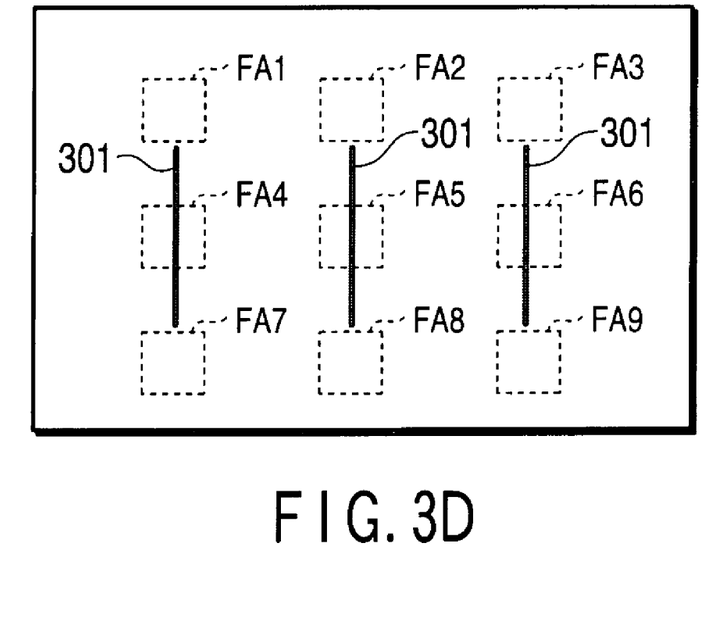
FIG. 3D shows an example of a finder image (a shooting field of view)
Figure 3E:
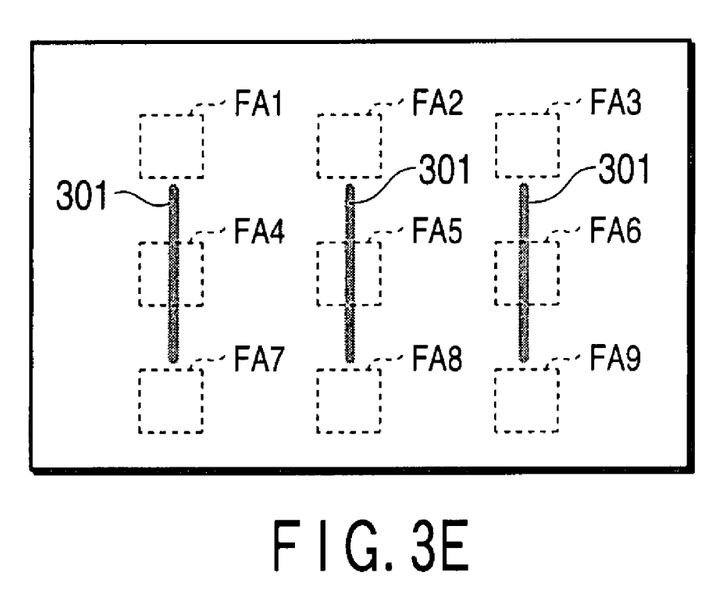
FIG. 3E shows an example of a finder image (a shooting field of view)

Finder images shown in FIGS. 3D and 3E are finder images, which is obtained when a plane focused on an image-forming surface exists in a photographer (so-called "rear-focus").

Figure 4:
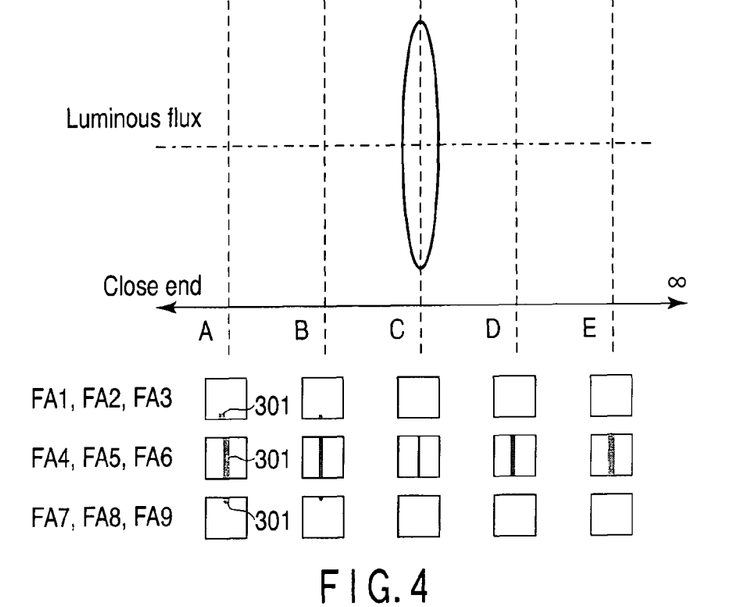
FIG. 4 shows an example of correlation between a focusing lens 102 position and focus detection area in the finder images shown in FIGS. 3A to 3E.

FIG. 4 shows an example of relationship between the positions of the focusing lens 102 and the finder images shown in FIGS. 3A to 3E.

The lens positions A to E shown in FIG. 4 indicate the lens position when the finder images shown in FIGS. 3A to 3E are obtained. Under the lens positions shown in FIG. 4, the focus adjustment areas FA1 to FA9, when the focusing lens 102 is located at the lens positions, and the chart 301, which is a subject in the focus adjustment areas FA1 to FA9, are shown.

Figure 5:
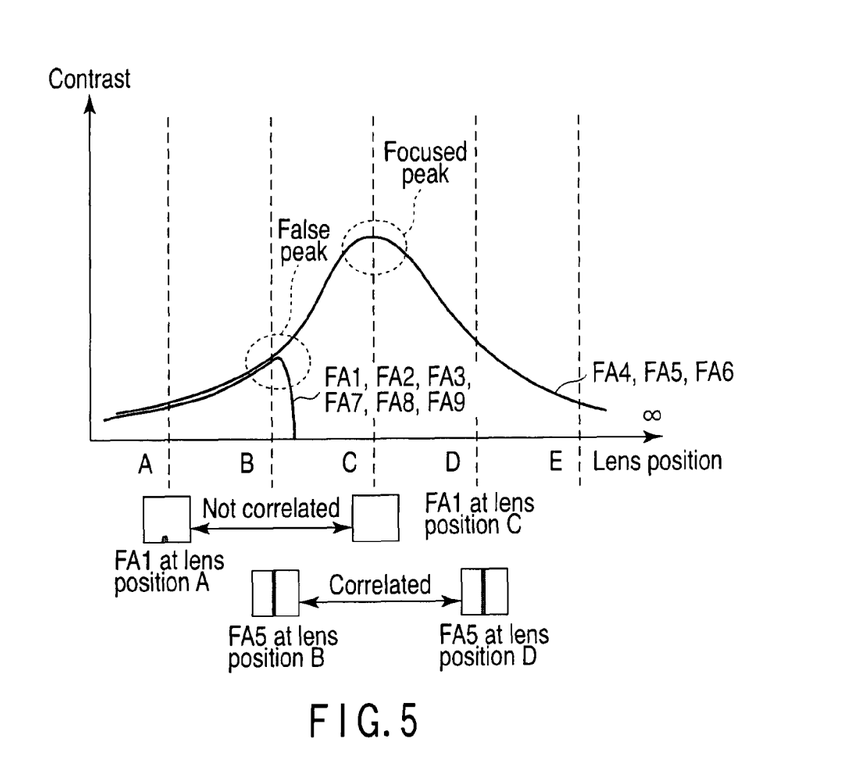
FIG. 5 is a graph showing correlation between contrast and lens positions, when a calculated contrast value in each focus adjustment area FA1 to FA9 is expressed on an axis of ordinate, and positions of a focusing lens 102 is expressed on an axis of abscissa.

Besides, FIG. 5 is a graph showing correlation between contrast and lens positions, when a calculated contrast value in each focus adjustment area FA1 to FA9 is expressed on an axis of ordinate, and positions of the focusing lens 102 is expressed on an axis of abscissa.

As seen from FIG. 5, at the lens position C, a correct contrast peak is indicated as a focused position in the focus adjustment areas FA4, FA5 and FA6. At the lens position B, a peak is indicated in the focus adjustment areas FA1, FA2, FA3, FA7, FA8 and FA9, but actually, it is not a focused position, and the peak is detected as a false contrast peak.

Under the lens positions corresponding to the above peaks (focused peak and false peak), the image of the subject (chart 301) in the focus adjustment areas FA1 and FA5 at the lens positions before and after those lens positions is shown.

Namely, as seen from the drawing, correlation does not exist between the subject images (the chart 301) in the focus adjustment area FA1 at the lens positions (A and C) before and after the lens position corresponding to a false peak (the lens position B).

In contrast, correlation exists between the subject images (the chart 301) in the focus adjustment area FA5 at the lens positions (B and D) before and after the lens position corresponding to a focused peak (the lens position C).

The above correlation is used for autofocus control during Live View, in the focus adjustment apparatus and image capturing apparatus according to this embodiment.

Figure 6A:
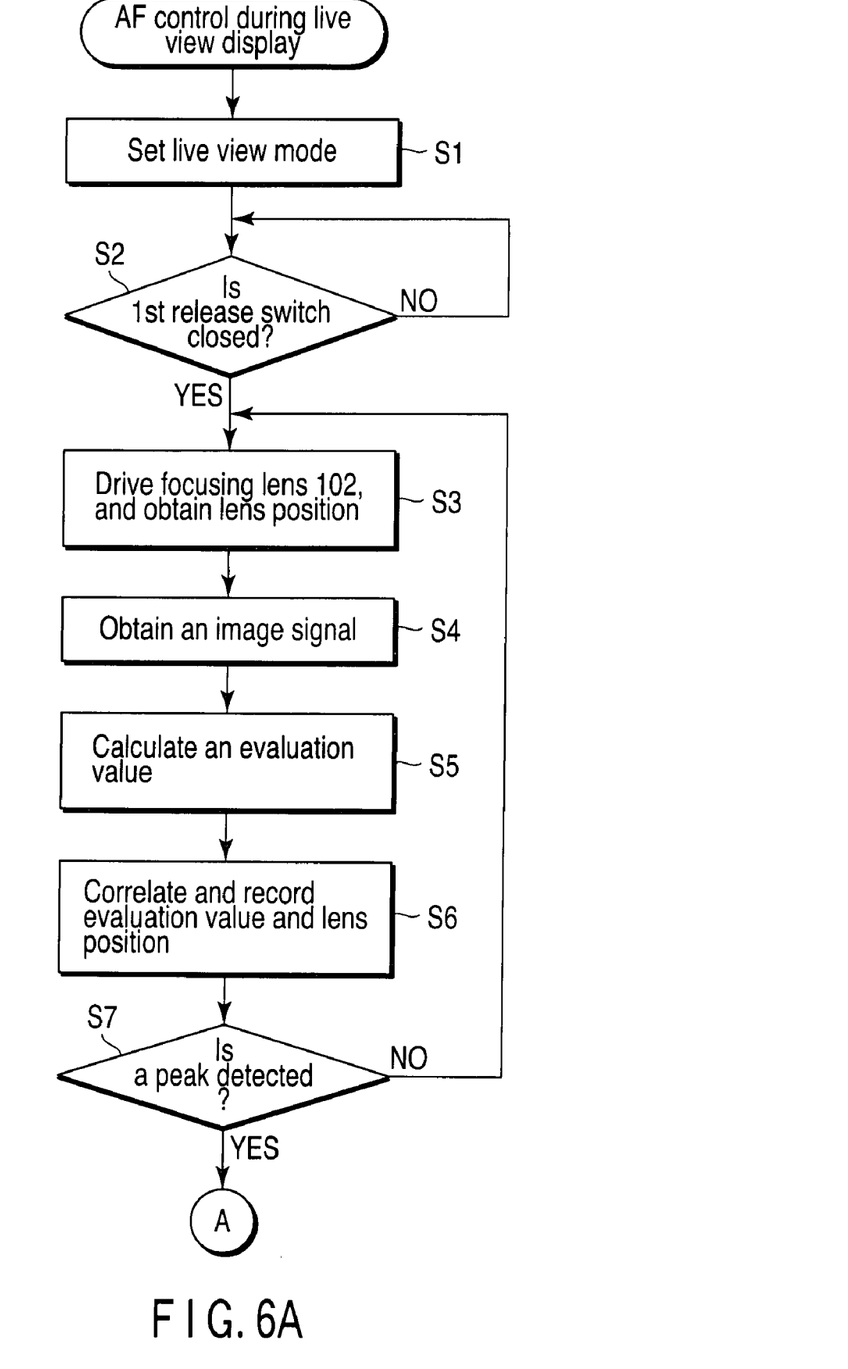
FIG. 6A is a flowchart of an autofocus control sequence during Live View, by a system controller of a focus adjustment apparatus and image capturing apparatus according to an embodiment of the invention.
Figure 6B:
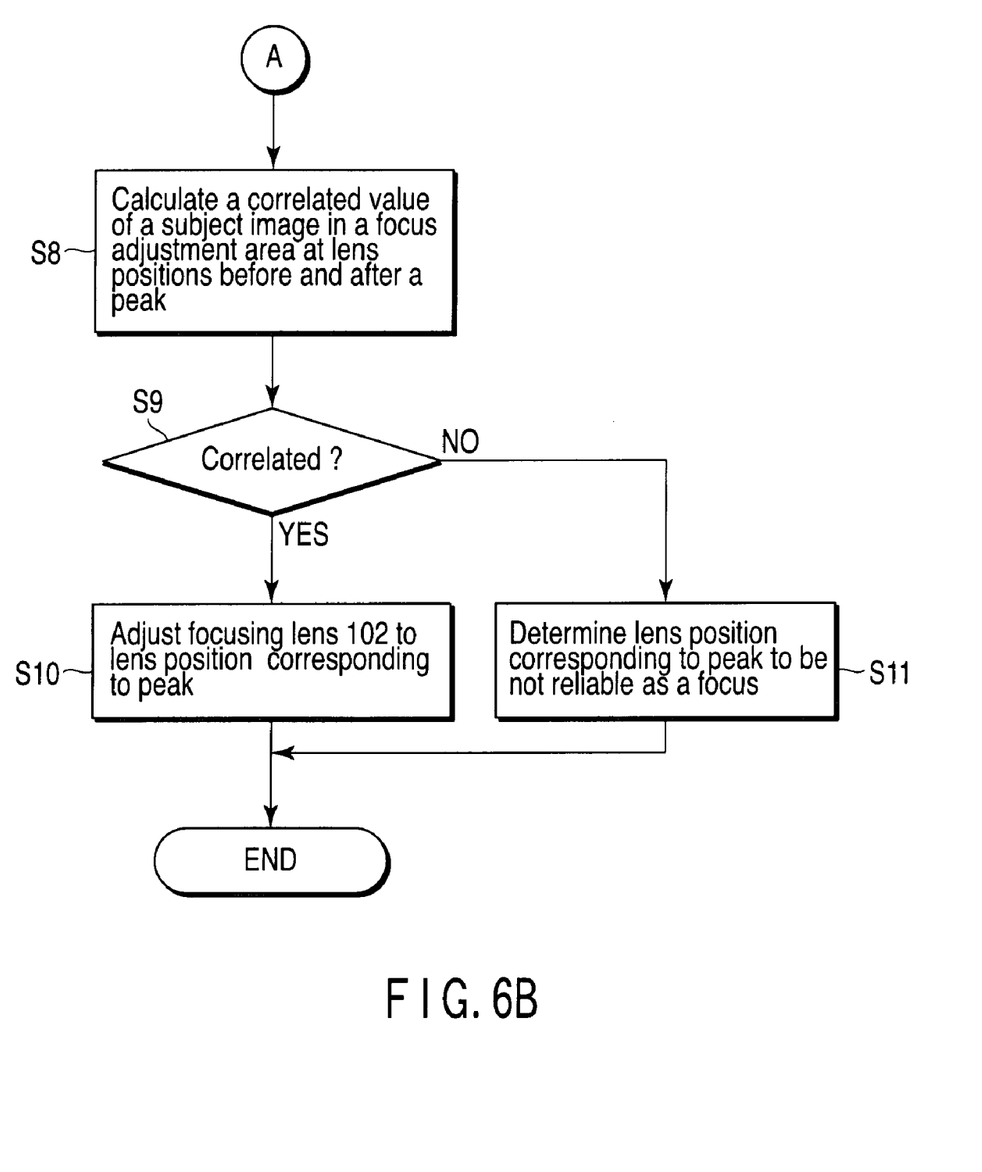
FIG. 6B is a flowchart of an autofocus control sequence during Live View, by a system controller of a focus adjustment apparatus and image capturing apparatus according to an embodiment of the invention.

Hereinafter, an explanation will be given of the autofocus control during Live View by the system controller 123 of the focus adjustment apparatus and image capturing apparatus according to this embodiment, by referring to the flowchart shown in FIG. 6B.

First, the user sets a live view mode for Live View (step S1). In step S1, the user sets the live view mode by operating the setting switch 129 by referring to a menu display screen on the display unit 125, for example.

When the live view mode is set, the display unit 125 displays an image of a subject formed in the image sensor 124 through the interchangeable lens 101.

Then, the user presses the release button 128 halfway, and determines whether the first release switch is turned on (step S2). When No in step S2, step S2 is resumed. Namely, step S2 is a step waiting for the release button 128 to be set to the first release state.

When YES in step S2, the following focus adjustment process is started.

First, the focusing lens 102 is moved to the infinity side or close end side by communicating with the lens CPU 104, and the lens position detected by the encoder 107 is obtained (step S3).

Then, parallel to the above operation of the focusing lens 102 in step S3, the image sensor 124 converts an image of a subject formed by the focusing lens 102 to a video signal (step S4).

The video signal is output from the image sensor 124 to the display unit 125, and displayed in the display unit 125, and a luminance component of the subject image is extracted, and its evaluation value is calculated (step S5). A contrast value is used as an evaluation value.

A contrast value is an extracted luminance component data, and can be calculated by calculating the difference between maximum and minimum values in each focus adjustment area.

The evaluation value calculated in step S5 is correlated to the lens position of the focusing lens 102, and the correlated data is stored in the memory in the system controller 123 (step S6).

By repeating the above focus adjustment process of step S3 to step S6, the relationship between the contrast and the lens position of the focusing lens 102 shown in FIG. 5 can be obtained.

By referring to this relationship, whether a contrast peak is detected is determined (step S7). When NO in step S7, step S3 is resumed. Namely, the focus adjustment process of step S3 to step S6 is repeated until a contrast peak is detected.

In contrast, when YES in step S7, a correlation value between images (subject images) in the focus adjustment areas at the lens positions before and after the lens position where the contrast reaches a peak is calculated (step S8).

Then, whether the images (subject images) in the focus adjustment areas at the lens positions before and after the lens position where the contrast reaches a peak are correlated is determined based on the correlation value calculated in step S8 (step S9).

When NO in step S9, the lens position corresponding to the contrast peak is determined to be unreliable as a focusing position (step S11), and the autofocus control process is finished.

When YES in step S9, the position of the focusing lens 102 is adjusted to the lens position corresponding to the contrast peak (step S10).

Hereinafter, an explanation will be given of the processing in steps S7 to S11 by referring to the example shown in FIG. 5.

As described above, in the example shown in FIG. 5, when the focusing lens 102 is located at the lens positions B and C, a contrast peak is detected.

<<Lens Position C>>

Concerning the image (subject image) in the focus adjustment area FA5, a correlation value between the lens positions B and D immediately before and after the lens position C is calculated, and correlation is determined. In the example shown in FIG. 5, correlation is confirmed (reliable as a focused position), and the focusing lens 102 is adjusted to the lens position C.

<<Lens Position B>>

Concerning the image (subject image) in the focus adjustment area FA1, a correlation value between the lens positions A and C immediately before and after the lens position B is calculated, and correlation is determined. In the example shown in FIG. 5, correlation is not confirmed (unreliable as a focused position), and the lens position B is eliminated from an object to which the focusing lens 102 is focused.

Figure 7:
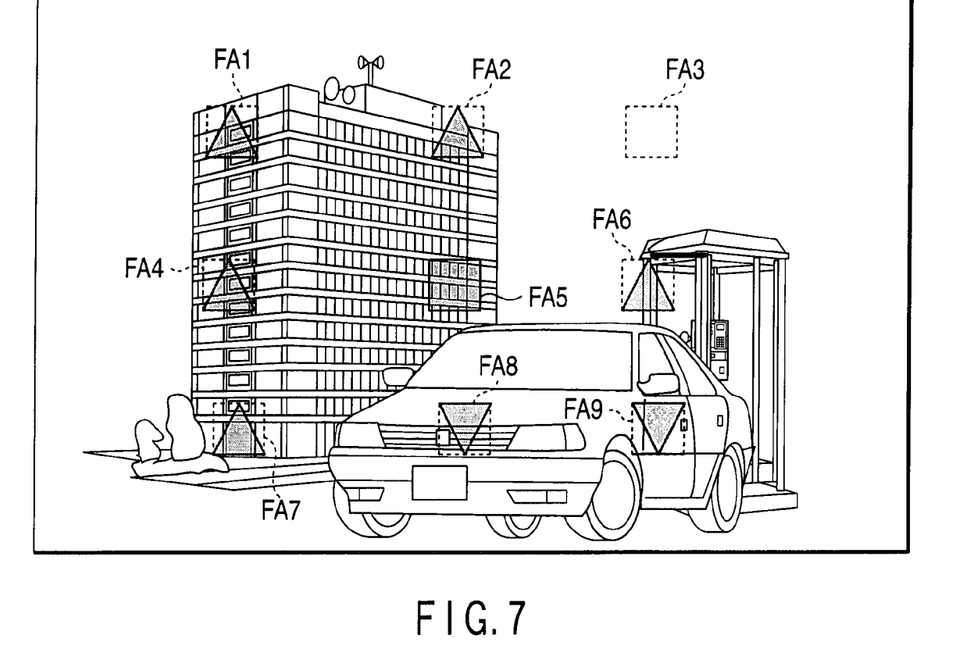
FIG. 7 shows an example of display in a display unit, when photo shooting is performed by a focus adjustment apparatus and image capturing apparatus according to an embodiment of the invention.

FIG. 7 shows an example of display in the display unit 125, when photo shooting is performed by the focus adjustment apparatus and image capturing apparatus according to this embodiment.

In the example shown in FIG. 7, the focus adjustment area FA5 is focused, but for the other focus adjustment areas, a sign indicating front-focus (an upward triangular mark) and a sign indicating rear-focus (a downward triangular mark) are superimposed.

Figure 8:
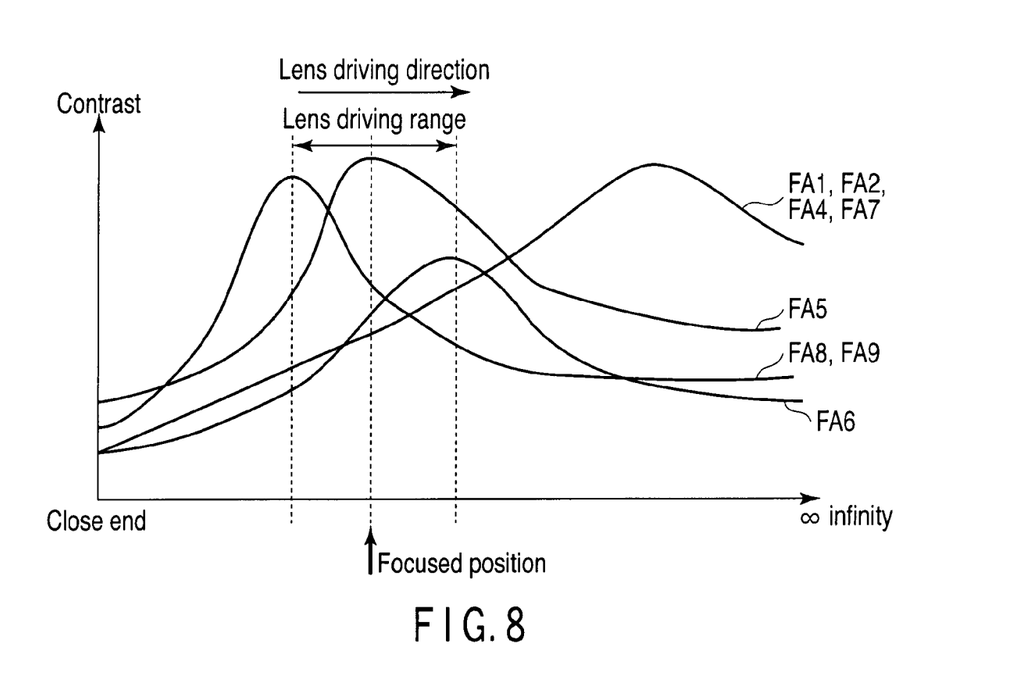
FIG. 8 shows a relationship between contrast and positions of a focusing lens 102 in the example shown in FIG. 7.

FIG. 8 shows a relationship between the contrast and the positions of the focusing lens 102 in the example shown in FIG. 7. This relationship can be obtained by performing the process from steps S3 to S6, as described above. In this example, the focusing lens 102 is driven from the near side to the infinity side.

As shown in FIG. 8, in the focus adjustment areas FA8 and FA9, the contrast value is decreased as the lens is driven, and the focus is the above so-called front-focus. On the other hand, in the focus adjustment areas FA1, FA2, FA3, FA4, FA6 and FA7, as the contrast is increased as the lens is driven, the focus is the above so-called rear-focus.

Information indicating the focus states such as "focused", "front-focus" and "rear-focus" obtained as described above is superimposed on a subject image in the display unit 125 as shown in FIG. 7.

A method of determining focus states is as follows, for example.

Rear-focus, when contrast is decreased while the focusing lens 102 is being moved to the infinity side (as in this example).

Front-focus, when contrast is increased while the focusing lens 102 is being moved to the infinity side (as in this example).

Front-focus, when contrast is decreased while the focusing lens 102 is being moved to the near side.

Rear-focus, when contrast is increased while the focusing lens 102 is being moved to the near side.

As explained above, according to this embodiment, it is possible to provide a focus adjustment apparatus and image capturing apparatus, which can prevent false focusing by the AF function based on the contrast method in a camera with a relatively long focal distance, for example, a single-lens reflex camera, even if a focus adjustment area exists at the end of a shooting field of view.

Besides, as the amount of data and calculation required for the AF function is suppressed, the time required for detecting a focused position is increased a little, even if a plurality of focus adjustment area exists in a shooting field of view, and as a result, it becomes difficult to lose a shutter chance.

Further, it is also possible to detect a focused position even for a complicated subject including both far and near points.

As described above, the focus adjustment apparatus and image capturing apparatus are applicable to various scenes peculiar to a single-lens reflex camera.

Namely, according to the focus control of the focus adjustment apparatus and image capturing apparatus of this embodiment, images at a lens position close to a lens position where contrast reaches a peak are compared, and reliability (focus reliability) of the contrast peak is determined. Thereby, false focusing can be prevented without increasing the arithmetic operation time.

(Notes)

The following configurations of the invention can be extracted from the above-described embodiments.

(1) A focus adjustment apparatus comprising:

an evaluation value calculation unit which calculates a focus evaluation value in a focus detection area when a focusing lens reaches each lens position, according to the focusing lens which is driven to said each lens position;

a peak value detection unit which detects a peak value of the focus evaluation value, based on the focus evaluation value calculated by the evaluation value calculation unit;

a correlation value calculation unit which calculates a correlation value between an image in the focus detection area when the focusing lens is located at a lens position apart by a predetermined distance from a lens position where the peak value is reached, to a close end side, and an image in the focus detection area when the focusing lens is located at a lens position apart by a predetermined distance from a lens position where the peak value is reached, to an infinity side; and a focused lens position determination unit which determines a lens position where the peak value is reached, to be a focused lens position of the focusing lens, when the correlation value calculated by the correlation value calculation unit is over a predetermined value.

Correspondence to the Embodiments

The above focusing lens corresponds to the focusing lens 102, and the focus detection area corresponds to the focus adjustment areas FA1, FA2, FA3, FA4, FA5, FA6, FA7, FA8 and FA9. The above evaluation value calculation unit, peak value detection unit and correlation value calculation unit, and focusing lens position determination unit correspond to the system controller 123, for example.

Functions

The system controller 123 separates the image data, which is formed by a focusing lens and is photoelectrically converted by the image sensor 124, to a luminance component, and calculates contrast based on the luminance component. These operations are performed by driving the focusing lens 102, and a peak value of contrast is detected. An image obtained at a lens position close to an infinity side by a predetermined distance from a lens position corresponding to the detected peak value, is compared with an image at a lens position close to a close end side by a predetermined distance from a lens position corresponding to the detected peak value. When correlation is confirmed between these images, the corresponding lens position is determined to be a focused position. When correlation is not confirmed between these images, the corresponding lens position is determined to be a false focus.

Effects

The focus adjustment apparatus and image capturing apparatus can prevent false focusing, and increase in the time required for the automatic focusing (AF), and can be applied to all kinds of subject. It is also possible to prevent false focusing, when a high-contrast subject exists close to a focus adjustment area, and prevent an increase in the arithmetic operation amount.

(2) A focus adjustment apparatus comprising:

one or more focus detection areas provided in a shooting field of view;

an evaluation value calculation unit which calculates a focus evaluation value in each said focus detection areas when a focusing lens reaches each lens position, according to a focusing lens which is driven to each said lens position;

a peak value detection unit which detects a peak value of the focus evaluation value based on the focus evaluation value, for each said focus detection area;

a correlation value calculation unit which calculates a correlation value between an image in the focus detection area when the focusing lens is located at a lens position apart by a predetermined distance from a lens position where the peak value is reached, to a close end side, and an image in the focus detection area when the focusing lens is located at a lens position apart by a predetermined distance from a lens position where the peak value is reached, to an infinity side, for each said focus detection area; and a focused lens position determination unit which determines whether the correlation value calculated by the correlation value calculation unit is over a predetermined value, for each said focus detection area, and determines a lens position where the peak value is reached, to be a focused lens position in each said focus detection area, when the correlation value calculated by the correlation value calculation unit is over a predetermined value.

Functions

A shooting field of view is divided into two or more areas, and an evaluation value is calculated for each area.

Effects

In addition to the same effects as in the focus adjustment apparatus described in the above (1), a focus can be adjusted to a part of the shooting field of view, increasing a width of applicable shooting scene.

(3) The focus adjustment apparatus according to (2), further comprising:

a focus state detection unit which detects an increase and decrease in the focus evaluation value in the focus detection area, for each said focus detection area, and detects a focus state in each said focus detection area, based on the increase and decrease and the lens driving direction; and a display unit which displays the focus state over an image in each said focus detection area, for each said focus detection area.

Functions

States of focus other than a focused state are displayed over an image on the display unit, based on the focus lens driving direction and changes in contrast.

The invention has been explained herein based on the embodiments. The invention is not limited to the described embodiments. Modifications and applications are possible without departing from the essential characteristics of the invention.

Besides, the embodiments described herein include various stages of the invention. The invention may be embodied in other specific forms by appropriately combining the disclosed constituent elements. For example, even if some constituent elements are deleted, the problem described in Theme to be Solved by the Invention can be solved, and when the effects described in Effects of the Invention are obtained, a configuration, in which some constituent elements are deleted, may be extracted as an aspect of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focus adjustment apparatus comprising:
an evaluation value calculation unit which calculates a focus evaluation value in a focus detection area in a shooting field of view, when a driven focusing lens reaches a predetermined lens position;
a peak value detection unit which detects a peak value of the focus evaluation value, based on the focus evaluation value calculated by the evaluation value calculation unit, according to driving of the focusing lens;
a correlation value calculation unit which calculates a correlation value between an image in the focus detection area when the focusing lens is located at a lens position apart by a predetermined distance from a lens position where the focus evaluation value reaches the peak value, to a close end side, and an image in the focus detection area when the focusing lens is located at a lens position apart by a predetermined distance from a lens position where the focus evaluation value reaches the peak value, to an infinity side; and
a focused lens position determination unit which determines a lens position where the focus evaluation value reaches the peak value, to be a focused lens position of the focusing lens, when the correlation value calculated by the correlation value calculation unit is over a predetermined value.

2. A focus adjustment apparatus comprising:
one or more focus detection areas provided in a shooting field of view;
an evaluation value calculation unit which calculates a focus evaluation value in the focus detection area, when a driven focusing lens reaches a predetermined lens position;
a peak value detection unit which detects a peak value of the focus evaluation value based on the focus evaluation value, for each said focus detection area;
a correlation value calculation unit which calculates a correlation value between an image in the focus detection area when the focusing lens is located at a lens position apart by a predetermined distance from a lens position where the focus evaluation value reaches the peak value, to a close end side, and an image in the focus detection area when the focusing lens is located at a lens position apart by a predetermined distance from a lens position where the focus evaluation value reaches the peak value, to an infinity side, for each said focus detection area; and
a focused lens position determination unit which
determines whether the correlation value calculated by the correlation value calculation unit is over a predetermined value, for each said focus detection area, and determines a lens position where the focus evaluation value reaches the peak value, to be a focused lens position in each said focus detection area, when the correlation value calculated by the correlation value calculation unit is over a predetermined value.

3. The focus adjustment apparatus according to claim 2, further comprising:
a focus state detection unit which detects an increase/decrease state of the focus evaluation value for each said focus detection area, and detects a state of focus in each said focus detection area, based on the increase/decrease state and the lens driving direction; and
a display unit which displays the state of focus over an image in the focus detection area, for each said focus detection area.

4. An imaging unit comprising:
an evaluation value calculation unit which calculates a focus evaluation value in a focus detection area in a shooting field of view, when a driven focusing lens is located at each lens position;
a peak value detection unit which detects a peak value of the focus evaluation value, based on the focus evaluation value calculated by the evaluation value, calculation unit;
a correlation value calculation unit which calculates a correlation value between an image in the focus detection area when the focusing lens is located at a lens position apart by a predetermined distance from a lens position where the focus evaluation value reaches the peak value, to a close end side, and an image in the focus detection area when the focusing lens is located at a lens position apart by a predetermined distance from a lens position where the focus evaluation value reaches the peak value, to an infinity side; and
a focused lens position determination unit which determines a lens position where the focus evaluation value reaches the peak value, to be a focused lens position of the focusing lens, when the correlation value calculated by the correlation value calculation unit is over a predetermined value.

5. An image capturing apparatus comprising:
one or more focus detection areas provided in a shooting field of view;
an evaluation value calculation unit which calculates a focus evaluation value in each said focus detection area, when a driven focusing lens is located at each lens position;
a peak value detection unit which detects a peak value of the focus evaluation value based on the focus evaluation value, for each said focus detection area;
a correlation value calculation unit which calculates a correlation value between an image in the focus detection area when the focusing lens is located at a lens position apart by a predetermined distance from a lens position where the focus evaluation value reaches the peak value, to a close end side, and an image in the focus detection area when the focusing lens is located at a lens position apart by a predetermined distance from a lens position where the focus evaluation value reaches the peak value, to an infinity side, for each said focus detection area; and
a focused lens position determination unit which
determines whether the correlation value calculated by the correlation value calculation unit is over a predetermined value, for each said focus detection area, and determines a lens position where the focus evaluation value reaches the peak value, to be a focused lens position in each said focus detection area, when the correlation value calculated by the correlation value calculation unit is over a predetermined value.

6. The image capturing apparatus according to claim 5, further comprising:

a focus state detection unit which detects an increase and decrease in the focus evaluation value in the focus detection area for each said focus detection area, and detects a state of focus in each said focus detection area, based on the increase and decrease and the lens driving direction; and a display unit which displays the state of focus over an image in the focus detection area, for each said focus detection area.

* * * * *